Feb. 27, 1934.   F. I. MORGAN   1,948,591
ELECTRICAL GOVERNOR
Filed May 20, 1931
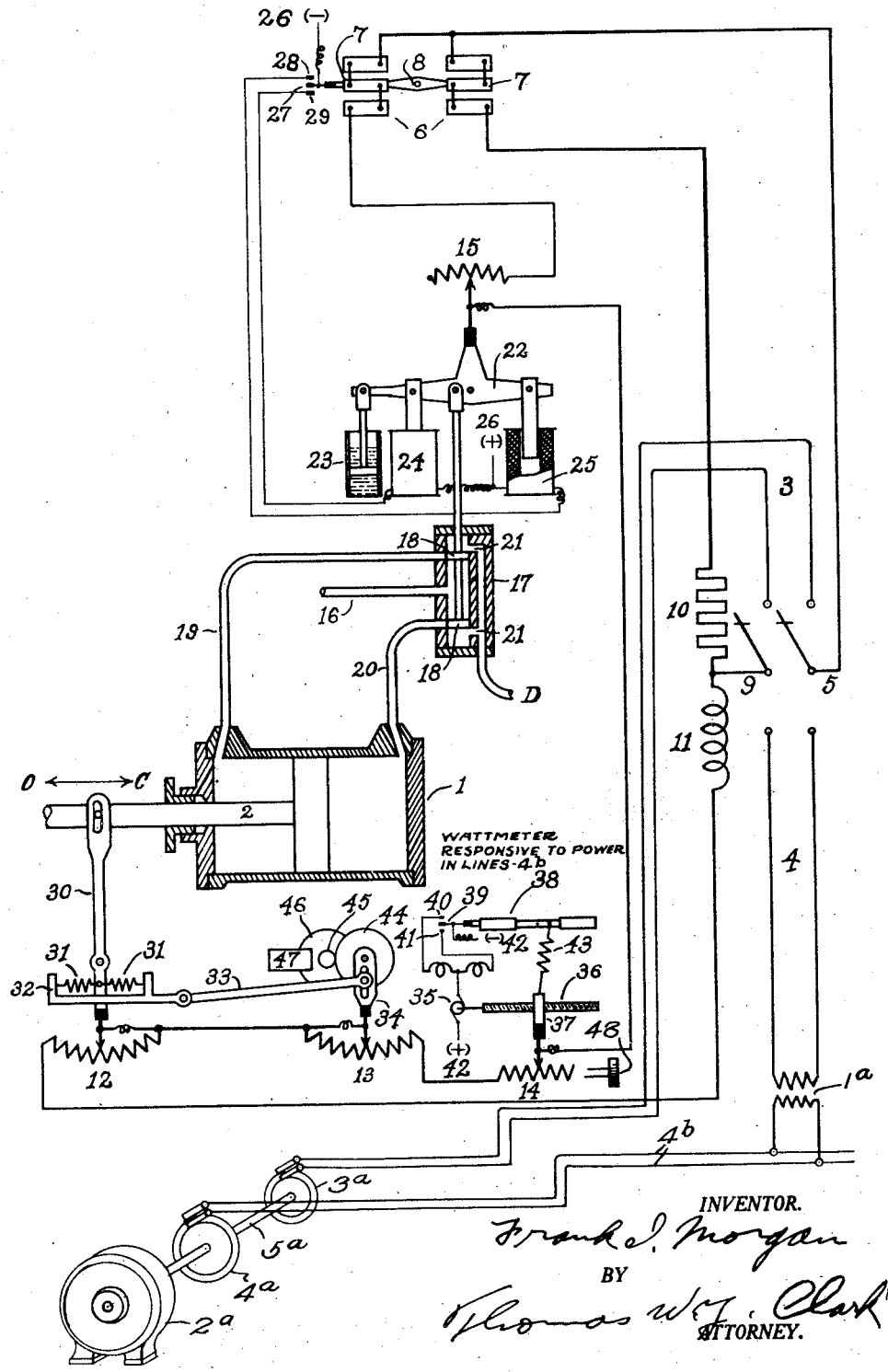
INVENTOR.
Frank I. Morgan
BY
Thomas W. F. Clark
ATTORNEY.

Patented Feb. 27, 1934

1,948,591

UNITED STATES PATENT OFFICE 1,948,591

ELECTRICAL GOVERNOR

Frank I. Morgan, Holtwood, Pa.

Application May 20, 1931. Serial No. 538,793

6 Claims. (Cl. 290—40)

My invention relates to an electric governor and an object thereof is to make a governor that will respond to each minute change in the speed of the prime mover, the energy supply of which is being governed, another object is to make a governor in which the variation in energy supply will be proportional to the variation in the speed of the prime mover. Another object is to make a governor that is always ready to respond to a prime mover speed change, regardless of what the speed was prior to the change. Another object is to make a governor that will have few moving parts and consequently little to get out of order. Another object of my invention is to make a governor that will be responsive to current load changes, thereby anticipating prime mover speed changes, and consequently being yet more sensitive. Another object of my invention is that the governor may be hand manipulated. Parts of my governor may be mounted on a switch board and thereby save floor space, also the governors of several units may be mounted together and facilitate control and inspection. Other objects and advantages of my invention will be apparent from the following description and the accompanying drawing forming a part hereof, and in which the figure shown is a schematic view of the devices used in the governor and the connections therefor.

A prime mover, such as a mercury vapor, gas, steam or hydraulic turbine or other engine driven by an elastic fluid has a valve or gate supply which may be opened or closed by a power cylinder, or servo-motor 1 having piston rod 2, the movement of which controls the opening and closing of this valve or gate. The prime mover drives a dynamo-electric machine or other apparatus or its power may be used directly to drive machinery.

The governor may take its power through lines 4, potential transformer 1a and lines 4b from a generator 4a driven by the prime mover 2a, by throwing the two-way switch, or it may preferably take its power through lines 3 from a small alternating current generator 3a on the main turbine shaft 5a. One line of the circuit 5 leads directly to both sides, in parallel, of a modified Kelvin balance 6. This balance consists of three coils on each side, the two center coils 7 being mounted on a lever pivoting at its center 8, like a scale. The current in two adjacent coils on each side flows around the coils in the same direction, and in the third coil, on each side, in the opposite direction, so that the movable coils will be in balance, like a balanced scale, when currents having the same magnetic effect pass through both sides of the balance, but a variation of the current in either side will unbalance the movable coils, and they will swing up or down about the fulcrum point 8 like a scale beam.

The other line 9 of the governor circuit is divided, and in one branch has a resistance 10, of constant value, and with a negligible temperature coefficient, in series with one side of the Kelvin balance. In the other branch of line 9 are connected, in series, an inductive (or capacitive) reactance 11, and four variable rheostats, 12, 13, 14 and 15 and the other side of the Kelvin balance.

The values of resistances 10, and 12, 13, 14 and 15 and of reactance 11 are so proportioned that equal currents will flow in the two sets of coils of the Kelvin balance at the standard frequency of the current generated by the generator driven by the prime mover, the energy input to which is controlled by the servo-motor.

The piston of servo-motor 1 is reciprocated back and forth by air or other fluid, under pressure, from pipe 16 entering valve 17. Valve 17 likewise has two pistons 18, and in their mid-position the pistons will prevent the passage of pressure through the valve. In their upper positions they will permit the pressure to enter on the left side of the piston in the servo-motor 1 through pipe 19 and close the energy supply to the prime mover. In their lower position they will permit the pressure to enter on the right side of the piston in the servo-motor 1, through pipe 20, and open the energy supply to the prime mover. Discharge ports 21 allow the exhausting of fluid from the back of the moving piston in the servo-motor 1.

The piston rod of valve 17 is reciprocated by rocking arm 22, to which it is pivoted a little to one side of the pivot of arm 22. Arm 22 is dampened in its movements by dash pot 23. Arm 22 may be rocked by solenoids 24—25 pulling on iron cores depending from each end of the arm. Current for the operation of the solenoids may be supplied to the leads 26, one of which connects to one end of the coils of each solenoid, and the other to a contact 27 on one movable coil 7 of the Kelvin balance. Contacts 28 and 29 respectively, lead to the other ends of the solenoids. Upon a movement down, for instance, of the left coil 7 of the Kelvin balance, contacts 27 and 29 will engage, solenoid 24 will be energized, arm 22 will be pulled down, to the left, and thereby lower the piston rod of valve 17 and admit pressure to the right side of the piston in the servo-motor 1 and consequently, open the supply inlet to the prime mover. The closing of contacts 27 and 28 would, in the same manner, cause the opposite movement of the servo-motor piston.

An intermediately pivoted lever 30, swung back and forth by a pin on piston rod 2, operates rheostat 12, adding more resistance to the governor circuit when the servo-motor 1 is moving to open the energy supply to the prime mover. To this lever 30, compensation springs 31 are attached, which are mounted on bracket 32. This bracket forms one end of link 33, pivoted thereto, and the other end of this link is vertically adjustable in arm 34. Arm 34 operates rheostat 13, oppositely to rheostat 12, since when resistance is being added to the governor circuit by rheostat 12, it is being removed from the circuit by rheostat 13, but more slowly, due to the springs 31 and the damper hereafter described.

Rheostat 14 is operated by reversible motor 35 revolving screw 36 thereby moving the rheostat contact on nut 37 back or forth. The motor 35 has a double field winding, energizing one will drive the motor one way, and energizing the other will drive it in the reverse direction.

A commercial relay type wattmeter is operated from the main generator current and a variation of the current load will unbalance the movable potential coils 38 of the wattmeter. One of coils 38 has a contact 39 attached thereto which may engage with contacts 40 and 41, one connected to each of the field windings of motor 35.

Motor 35 has battery leads 42, one connected to its armature and the other to contact 39. A variation of the load on the main generator will, therefore, actuate the wattmeter, and drive motor 35 in the direction determined by the wattmeter, and resistance, by rheostat 14, will be added to or taken from the governor circuit. The wattmeter sometimes has a sliding weight on a beam, like a scale beam, and as deflection from balance takes place, movement of the weight would restore the balance. In the present commercial wattmeter this weight is replaced by spring 43 attached to the movable coil connecting beam at one end and to nut 37 on screw 36 at its other end, so that as the load increases or decreases, resistance is subtracted from or added to the governor circuit, the Kelvin balance 6 is upset and the servo-motor is finally operated to adjust the energy supply in proportion to the change in load demand and spring 43 pulls the coils 38 of the wattmeter back in balance, stopping motor 35.

The purpose of the wattmeter is to start the adjustment of the prime mover energy supply before an actual speed change occurs, thus anticipating the need for such adjustment and thereby aiding in obtaining a more steady speed of the unit.

Rheostat 15 is operated directly by rocker arm 22 and is moved at once by the solenoids 24 or 25 to exactly counterbalance the unbalanced circuit due to the initial change of current passing through the governor circuit resulting from the change in reactance 11 because of a change in frequency. When the piston rod of valve 17 is moved to add energy to the prime mover, rheostat 15 increases the resistance in the governor circuit exactly proportional to the increase of current permitted to pass through reactance 11 upon a decrease in the frequency of the current caused by a slowing down of the main turbine shaft. This balancing of the governor circuit takes place at once upon a movement of the piston rod of valve 17 to rebalance Kelvin balance 6.

Movements of arm 34 are dampened (or retarded) by the revolving of aluminum (or copper) disc 46 between the poles of the magnet 47. The disc is driven by arm 34 through large gear 44 and small gear 45. As the disc revolves, an electromotive force is induced by the magnet 47 and currents flow in the disc in such a direction as to oppose its motion. Thus the rheostat arm 34 is compelled to gradually move to the position of rest determined by lever 30 of rheostat 12.

When the frequency of the current of the generators leading to lines 3 or 4 falls off from the predetermined standard, the reactance 11 permits more current to pass through to Kelvin balance 6. The balance then closes contacts 27 and 29 energizing solenoid 24 which pulls rocker arm 22 down to the extent determined by the frequency change, because the contact of 27 and 29 lasts until the governor circuit is balanced, with the frequency change present, by rheostat 15. When the governor current is thus balanced, coils 7 go back to their central or balanced position. Movement of the core of solenoid 24 pulls the piston rod of valve 17 down and admits pressure to the servo-motor right side, and thereby admits energy to the prime mover. As piston rod 2 moves to the left, rheostat 12 at once moves to add resistance to the governor circuit. The piston rod having moved a proportionate amount, as determined by the original change in frequency, and having moved rheostat 12 a correspondingly proportionate amount, Kelvin balance 6 is again disturbed, less current passing through the left side and contacts 27 and 28 engage, energizing solenoid 25, drawing the piston rod of valve 17 up and shutting off pressure to the servo-motor 1, and rheostat 15 decreases resistance in the governor circuit and restores balance 6. The prime mover is now operating at its new rate of energy supply and balance 6 and valve 17 are in their balanced and center positions.

As the prime mover slowly increases its speed the frequency in the main circuit increases, increasing the effect of reactance 11, again tending to upset balance 6. Springs 31, however, are gradually moving arm 34 to the right and decreasing the resistance of rheostat 13, and when it reaches its position of rest, the effect of the increase of frequency is exactly balanced by the change in resistance of rheostat 13, so that the Kelvin balance is not disturbed.

The governor may be made more or less isochronous by adjusting the position of link 33 in the slot in arm 34.

The coil of rheostat 14 may be adjusted longitudinally by hand, by member 48, diagrammatically shown, should it be desired to adjust the load to be carried by this unit by hand, or to adjust the load between this and other similar units. This adjustment may be made automatically should it be desirable to apply one of the commercial systems of frequency control.

It will be obvious to those skilled in the art that many details of the construction may be altered without departing from the spirit of my invention and my invention may be used for other purposes and I do not intend, therefore, that the illustration and description of the principle of my invention shall be a limitation thereof beyond what is necessary by the prior art or indicated in the following claims.

What I claim as new and desire to secure by Letters Patent is:

1. In combination a rotary prime mover, an operating fluid control device therefor and a source of alternating current operated thereby, a circuit for said alternating current having therein a current balance movement of which is adapted to initiate the operation of said control device, one line of said circuit having therein, in parallel, a resistance and an impedance so balanced that said current balance is balanced when said prime mover is revolving at a predetermined rate of speed and electrical means in series with one of said parallel circuits to vary the current therein proportionately to any variance of the current from said source to restore said current balance to balance.

2. In combination, a prime mover, an operating fluid control device therefor and a source of alternating current operated thereby, a circuit for said alternating current having therein a current balance movement of which is adapted to initiate the operation of said control device, one line of said circuit having therein, in parallel, a resistance and an impedance, means to vary the amount of said impedance upon a variation of the frequency of the current from said source.

3. In combination, a prime mover, an operating fluid control device therefor and a main generator and a small alternating current generator driven thereby, a circuit for said small generator having therein a balanced movable member, means in said circuit to cause a variation of the frequency of the current to unbalance said member, and means in said circuit responsive to a change of load on said main generator, to initiate the operation of said control device.

4. In combination, a prime mover, an energy supply control device therefor and a source of alternating current operated thereby, a circuit for said alternating current having therein a current balance, movement of which is adapted to initiate operation of said control device, means in said circuit to unbalance said current balance upon a variation of current in said circuit, means to restore said current balance to its initial position after operation of said control device and at the new energy supply for said prime mover determined by the initial variation of current in said circuit.

5. In combination, a prime mover, an energy supply control device therefor and a source of alternating current operated thereby, a circuit for said alternating current having therein a current balance movement of which is adapted to initiate operation of said control device, means in said circuit to unbalance said current balance upon a variation of current in said circuit, and means to initiate a movement of said control device proportionate to the variation of current in said circuit, means to restore said current balance to balance and means operated upon movement of said control device to vary said current to maintain the balance of the current balance for the initially varied current.

6. In combination, a prime mover, an energy supply control device therefor and a source of alternating current operated thereby, a circuit for said alternating current having therein a current balance comprising two movable members in parallel in the circuit, said members being movable upon a variation of the current in said circuit, one line of said circuit having therein in parallel and each in series with one of said members, an impedance and a resistance and means to restore said current balance to balance with the varied current passing therethrough and means operated upon movement of said control device to vary said current to maintain the balance of the current balance for the initially varied current.

FRANK I. MORGAN.